United States Patent [19]

Ogata

[11] Patent Number: 4,600,626
[45] Date of Patent: Jul. 15, 1986

[54] WEBBING SUITABLE FOR USE IN VEHICLE SEAT BELT SYSTEM

[75] Inventor: Shigeji Ogata, Ayase, Japan

[73] Assignee: NSK-Warner K.K., Japan

[21] Appl. No.: 767,416

[22] Filed: Aug. 20, 1985

[30] Foreign Application Priority Data

Sep. 28, 1984 [JP] Japan .................. 59-145947[U]

[51] Int. Cl.⁴ ............ A62B 35/00; D03D 15/00; D03D 51/00
[52] U.S. Cl. ................ 428/193; 139/384 R; 139/420 A; 280/801
[58] Field of Search ........ 428/193; 280/801; 139/384 R, 420 A

[56] References Cited

U.S. PATENT DOCUMENTS

| | | | |
|---|---|---|---|
| 3,606,914 | 9/1971 | Maiwald et al. | 139/420 |
| 4,018,960 | 4/1977 | Berger et al. | 428/193 |
| 4,107,371 | 8/1978 | Dean | 428/255 |
| 4,148,957 | 4/1979 | Berger et al. | 428/193 |
| 4,298,648 | 11/1981 | Turnbull | 428/195 |
| 4,370,784 | 2/1983 | Turnbull | 28/166 |
| 4,372,999 | 2/1983 | Satoo | 428/193 |
| 4,384,021 | 5/1983 | Aoyama | 428/193 |
| 4,481,981 | 11/1984 | Motte | 428/193 |

Primary Examiner—James C. Cannon
Attorney, Agent, or Firm—Wegner & Bretschneider

[57] ABSTRACT

A webbing suitable for use in a vehicle seat belt system includes wefts, each of which is composed in combination of a first weft thread having low bending stiffness and a second weft thread having high bending stiffness. Owing to the inclusion of the second weft threads, the webbing of this invention is resistant to lateral, i.e., widthwise flexure. Accordingly, there is a smaller danger for the webbing of this invention to develop jamming or turning-over when caused to extend through its associated through-anchor.

12 Claims, 4 Drawing Figures

WEBBING SUITABLE FOR USE IN VEHICLE SEAT BELT SYSTEM

BACKGROUND OF THE INVENTION

1. Field of the Invention

This invention relates to a webbing suitable for use in a vehicle seat belt system, and particularly to such a webbing having improved stiffness in the widthwise, i.e., lateral direction.

2. Description of the Prior Art

The above-mentioned webbing is pulled, for example, upwardly out of a retractor provided fixedly in a lower part of a center pillar and is then deflected downwardly by a through-anchor provided fixedly on an upper part of the center pillar so as to restrain the shoulder, lap area and the like of the occupant. Reflecting this manner of use, conventional webbings of the above sort were susceptible to widthwise flexure due to lack of thorough attention to their widthwise stiffness.

Such conventional webbings may be twisted or turned over at their associated through-anchors upon their wearing or release, thereby making their wearing or release difficult and in some instances impossible. In actual collision accidents or dynamic tests, such conventional webbings may be jammed at their associated through-anchors or in some worst cases, may be cut. The problems sought for solution by the present invention are to solve the above-mentioned difficulty in wearing or releasing the above webbings and/or to avoid the occurrence of jamming of the above webbings.

SUMMARY OF THE INVENTION

An object of this invention is to provide a webbing having improved widthwise stiffness.

Another object of this invention is to achieve the above object while enjoying the merits of conventional webbings without developing any new problem (e.g., a reduction to artistic appearance or feeling, etc.) by the thus-improved widthwise stiffness.

In one aspect of this invention, there is thus provided a webbing suitable for use in a vehicle seat belt system. The webbing includes a laterally-central main portion, and a woven selvedge portion and a knitted selvedge portion which are formed respectively along both side edges of the main portion. The weave of the main portion comprises a number of wefts composed respectively of first weft threads and second weft threads inserted in pairs. The first weft threads are individually formed of one or more filaments having relatively low bending stiffness and the second weft threads are individually formed of one or more filaments having relatively high bending stiffness. The second weft threads having the relatively high bending stiffness are woven only in the main portion. The first weft threads having the relatively low bending stiffness are contained not only in the main portion but also in the knitted selvedge portion where the first weft threads are intertwined with their corresponding catch threads, which hold their associated wefts and comprise threads having relatively low bending stiffness, to form a hollow selvedge. The woven selvedge portion forms a hollow selvedge with the first weft threads only.

Owing to the inclusion of the second weft threads, the webbing of this invention is resistant to lateral, i.e., widthwise flexure. Accordingly, there is a smaller danger for the webbing of this invention to develop jamming or turning-over when caused to extend through its associated through-anchor.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENT

Figure 1:
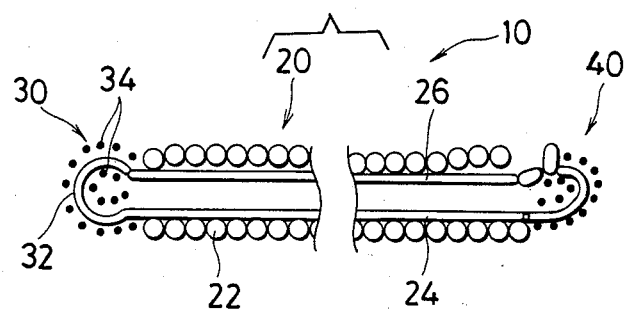
FIG. 1 is a widthwise cross-sectional view showing a webbing according to one embodiment of this invention, in which an intermediate part is omitted.
Figure 2:
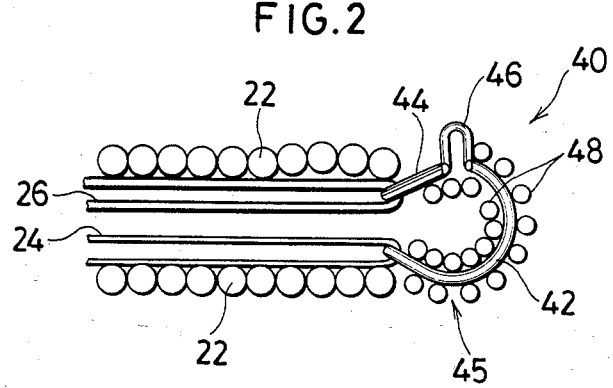
FIG. 2 is an enlarged fragmentary view of the webbing of FIG. 1.
Figure 3A:
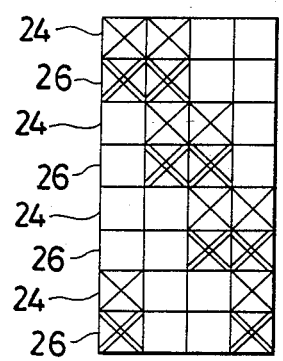
FIG. 3(a) is a weave pattern of the weave of the webbing of FIGS. 1 and 2.
Figure 3B:
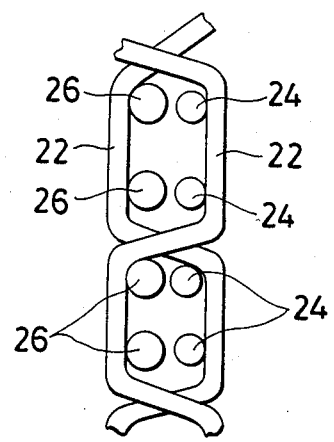
FIG. 3(b) is an enlarged schematic illustration of the weave of the webbing of FIGS. 1 and 2.

As illustrated in FIG. 1, a webbing 10 is composed of a main portion 20 which assumes a widthwise (i.e., the horizontal direction as viewed on FIG. 1) central part of the webbing 10, and selvedges 30,40 formed respectively along both side edges of the main portion 20. As shown in FIG. 1 and FIGS. 3(a) and 3(b), the main portion 20 has been formed by interlacing warps 22, each of which is composed of 304 polyester threads, each of 1260 denier thickness and 108 filaments, alternately with a first weft thread 24 of 500 denier thickness and 48 polyester filaments and a second weft thread 26 of 600 denier polyester monofilament, respectively at a density of 19 picks/30 mm and at a total density of 38 picks/30 mm.

The weave of the main portion 20 is of a 4-up/4-down weave as depicted in FIG. 3(b). Since two types of weft threads are woven in in pairs, the weave of the main portion 20 is of a 2-up/2-down weave as shown in FIG. 3(a). Despite of the relatively high density of the inserted weft threads, the resultant webbing still retains a suitable degree of longitudinal stiffness which is required for a webbing to be used in a seat belt system. In FIG. 3(a), each X sign means that at this point the first weft thread 24 in inserted, while each X sign in double lines indicates that at this point the second weft thread 26 is inserted.

Next, the left selvedge as seen on the FIG. 1, namely, the woven selvedge 30 has been formed by turning back parts 32 of the first weft threads 24. Along the inner and outer peripheries of the thus-turned parts 32, 36 selvedge warp threads each of which has a thickness of 500 denier and is formed of 48 polyester filaments have been woven in. The other selvedge, namely, the knitted selvedge 40 has been formed into a hollow or tubular shape with first catch threads 42,44, each of which is composed of a single polyester thread, of 250 denier thickness and 48 filaments, and the first weft threads 24, whereby the first and second weft threads 24,26 are held in place. In the knitted selvedge 40, there are woven 36 selvedge warps 48 each of which has a thickness of 500 denier and is formed of 48 polyester filaments. Accordingly, the numbers of the selvedge warps 34,48 inserted respectively in the selvedge portions 30,40 are one half of the warps 22 inserted in the main portion 20. The selvedge warps 34,48 are finer than the warps 22 of the main portion 20 and the weft threads are multifilaments. Therefore, the selvedge portions 30,40 are softer and more pleasant to the touch compared with the main portion 20.

Each of the second catch threads 46 has a thickness of 100 denier and is formed of 48 polyester filaments, and when the first catch threads 42,44 form loops, the second catch threads form loops together with the first catch threads 42,44. Accordingly, the second catch threads 46 serve as fraying stoppers.

The webbing 10 may be woven in the following manner. After inserting the second weft thread 26, the portion 42 of the first catch thread 45 is knitted in the end portion of the second weft thread 26. Subsequent to the insertion of the first weft thread 24, the portion 44 of the first catch thread 45 is also knitted in the end portion of the first weft thread 24. Thereafter, the second catch thread 46 is knitted in both portions 42,44.

Since the webbing 10 has been obtained by weaving, in pairs, the first weft threads 24 composed of multifilaments and the second weft threads 26 composed of monofilaments as described above, the widthwise stiffness of the webbing 10 has been improved owing to the contribution of the second weft threads 26 having higher stiffness. Owing to this improved widthwise stiffness, the webbing 10 is seldom turned over or jammed upon its passage through the associated through-anchor.

As a result of use of two types of threads 24,26 as weft threads, the knitted selvedge 40 is composed of three parts 42,44,46. In view of the balance in thickness, length, tension, etc. between these threads 42,44,46 and the weft threads 24,26, the loops formed by the second catch threads 46 are not positioned at the outer side edge of the knitted selvedge portion 40 but are located at positions close to the main portion 20. For this arrangement, these loops are not visible directly from the outside and both selvedge portions 30,40 have good appearance.

The above-described embodiment is only one of various embodiments of this invention. Needless to say, the present invention should not be interpreted as being limited to or by the above-described embodiment.

For example, as the second weft threads having high stiffness, it is possible to make suitable use of monofilament cuts, resin moldings, resin-treated multifilaments which may be either twisted or not twisted, metallic fibers, covered threads or the like beside the above-described monofilaments.

Furthermore, it is not essential that the second catch threads 46, which are knitted respectively in the portions 42,44 of the first catch threads 45, be located centrally in the selvedge 40. They may be located at the outer side edge of the selvedge 40. Needless to say, the weave of the main portion 20 is not necessarily limited to the 2-up and 2-down weave illustrated in FIGS. 3(a) and 3(b). The weave of the main portion 20 may be formed by weaving raw threads made of a polyamide resin, or by weaving raw threads made of a polyester resin and raw threads made of a polyamide resin in combination.

Having now fully described the invention, it will be apparent to one of ordinary skill in the art that many changes and modifications can be made thereto without departing from the spirit or scope of the invention as set forth herein.

What is claimed is:

1. In a webbing suitable for use in a vehicle seat belt system, including a laterally-central main portion, and a woven selvedge portion and a knitted selvedge portion which are formed respectively along both side edges of the main portion, the improvement wherein the weave of the main portion comprises a number of wefts composed respectively of first weft threads and second weft threads inserted in pairs, the first weft threads have relatively low bending stiffness and the second weft threads have relatively high bending stiffness, the second weft threads are woven only in the main portion, the first weft threads are contained not only in the main portion but also in the knitted selvedge portion where the first weft threads are intertwined with their corresponding catch threads, which hold their associated wefts and comprise threads having relatively low bending stiffness, to form a hollow selvedge, and the woven selvedge portion forms a hollow selvedge with the first weft threads only.

2. A webbing as claimed in claim 1, wherein the first weft threads are respectively composed of multifilaments and the second weft threads are respectively composed of monofilaments.

3. A webbing as claimed in claim 1, wherein the first weft threads are respectively composed of multifilaments and the second weft threads are respectively composed of resin-treated twisted multifilaments.

4. A webbing as claimed in claim 1, wherein the first weft threads are respectively composed of multifilaments and the second weft threads are respectively composed of resin-treated non-twisted multifilaments.

5. A webbing as claimed in claim 1, wherein the first weft threads are respectively composed of multifilaments and the second weft threads are respectively composed of metallic fibers.

6. A webbing as claimed in claim 1, wherein the first weft threads are respectively composed of multifilaments and the second weft threads are respectively composed of covered threads.

7. A webbing as claimed in claim 1, wherein the catch threads are respectively composed of multifilaments.

8. A webbing as claimed in claim 1, wherein the webbing additionally comprises a plurality of warps extending along the length of the webbing and the warps are respectively composed of multifilaments.

9. A webbing as claimed in claim 8, wherein the warps and wefts consist of polyester threads.

10. A webbing as claimed in claim 8, wherein the warps and wefts consist of polyamide threads.

11. A webbing as claimed in claim 8, wherein the warps employed in the woven and knitted selvedge portions are finer than the warps used in the main portion.

12. A webbing as claimed in claim 1, wherein the the catch threads are each composed of a first catch thread, which forms a loop together with its associated first weft thread and second weft thread, and a second catch thread forming another loop together with the first catch thread.

* * * * *